US010628953B2

(12) United States Patent
Uyeno et al.

(10) Patent No.: US 10,628,953 B2
(45) Date of Patent: *Apr. 21, 2020

(54) MULTIPLE TARGET TRACKER AND LIQUID CRYSTAL WAVEGUIDE (LCWG) BEAM STEERER FOR DESIGNATION, RANGE FINDING AND ACTIVE IMAGING

(71) Applicant: Raytheon Company, Waltham, MA (US)

(72) Inventors: Gerald P. Uyeno, Tucson, AZ (US); Sean D. Keller, Tucson, AZ (US); John R. Becker, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,741

(22) Filed: Jul. 27, 2018

(65) Prior Publication Data

US 2019/0066320 A1 Feb. 28, 2019

Related U.S. Application Data

(63) Continuation of application No. 14/864,151, filed on Sep. 24, 2015, now Pat. No. 10,062,175.

(51) Int. Cl.
*H04N 5/225* (2006.01)
*G06T 7/60* (2017.01)
(Continued)

(52) U.S. Cl.
CPC ............... *G06T 7/60* (2013.01); *G02F 1/295* (2013.01); *G06T 7/20* (2013.01); *G06T 7/50* (2017.01);
(Continued)

(58) Field of Classification Search
CPC combination set(s) only.
See application file for complete search history.

(56) References Cited

U.S. PATENT DOCUMENTS

| 4,810,088 A | 3/1989 | Karning et al. |
| 6,145,784 A * | 11/2000 | Livingston ............ F41H 13/005 244/3.11 |

(Continued)

FOREIGN PATENT DOCUMENTS

WO 2014/200581 A2 12/2014

OTHER PUBLICATIONS

Escuti et al., "A Polarization-Independent Liquid Crystal Spatial-Light-MOdulator," Proceedings of SPIE, vol. 6332, No. 63320M (2006).

*Primary Examiner* — Md N Haque
(74) *Attorney, Agent, or Firm* — Eric A. Gifford

(57) ABSTRACT

A multiple target tracker and beam steerer utilizes liquid crystal waveguide (LCWG) beam steering to illuminate multiple tracked targets per frame one target at a time for designation, range finding or active imaging. The steering rate and range afforded by the LCWG supports various tracker configurations (out-of-band, in-band or dual-band video cameras), LADAR detectors (single pixel or pixelated) and prioritization of tracked targets to vary the revisit rate or dwell time for an illuminated target. A user interface accepts commands from an operator to select the targeting mode, control cue-box size and position within the FOV and target selection.

10 Claims, 10 Drawing Sheets

(51) Int. Cl.
*G02F 1/295* (2006.01)
*H01S 3/00* (2006.01)
*G06T 7/20* (2017.01)
*H04N 5/232* (2006.01)
*G06T 7/50* (2017.01)

(52) U.S. Cl.
CPC ......... *H01S 3/0071* (2013.01); *H04N 5/2256* (2013.01); *H04N 5/23293* (2013.01)

(56) References Cited

U.S. PATENT DOCUMENTS

| | | | |
|---|---|---|---|
| 8,380,025 B2 | 2/2013 | Anderson et al. | |
| 8,400,619 B1* | 3/2013 | Bachrach | G01C 1/04 |
| | | | 356/4.01 |
| 9,587,804 B2* | 3/2017 | Chen | F21V 14/02 |
| 2005/0060092 A1 | 3/2005 | Hablani | |
| 2012/0188467 A1* | 7/2012 | Escuti | G02B 27/286 |
| | | | 349/1 |
| 2012/0292481 A1 | 11/2012 | Hutchin | |
| 2012/0297969 A1* | 11/2012 | King | F41A 23/20 |
| | | | 89/41.01 |
| 2016/0065956 A1* | 3/2016 | Uyeno | H04N 17/002 |
| | | | 348/187 |
| 2016/0266242 A1* | 9/2016 | Gilliland | G01S 7/4814 |

* cited by examiner

MULTIPLE TARGET TRACKER AND LIQUID CRYSTAL WAVEGUIDE (LCWG) BEAM STEERER FOR DESIGNATION, RANGE FINDING AND ACTIVE IMAGING

CROSS-REFERENCES TO RELATED APPLICATION

This application is a continuation and claims benefit under 35 U.S.C. Section 120 to the following co-pending U.S. patent application Ser. No. 14/864,151 filed on Sep. 24, 2015, entitled MULTIPLE TARGET TRACKER AND LIQUID CRYSTAL WAVEGUIDE (LCWG) BEAM STEERER FOR DESIGNATION, RANGE FINDING AND ACTIVE IMAGING and incorporates its entire disclosure by reference.

BACKGROUND OF THE INVENTION

Field of the Invention

This invention relates to target tracking and laser beam steering to illuminate the tracked targets for designation, range finding or active imaging, and more particularly to tracking and illumination of multiple targets per frame, one target at a time in a field-of-view (FOV).

Description of the Related Art

Laser beam steering is used to perform functions such as Designation, Range Finding and Active Imaging. Typically, a laser is configured to transmit a laser beam, typically pulsed, along a fixed transmission path ("along boresight"). The laser may be steered manually in a hand-held unit or automatically on a gimbal mounted system to point boresight at the target.

Laser Designation transmits an encoded pulsed laser beam at a wavelength of 1,064 nm to designate a target. The pulsed laser beam has a pulse repetition frequency (PRF) in which a defined pattern of pulses forms a designation code. Laser Designation of targets is used during acquisition, tracking and terminal guidance of guided munitions with a sensor commonly known as a semi-active laser (SAL) sensor.

Laser range finders transmit laser beams at a remote target to determine the distance or range to the remote target. Laser range finders generally operate on the "time of flight" principle by measuring the time taken for a laser pulse to travel to the target and be reflected back to the range finder. With the speed of the laser light being a known value, and with an accurate measurement of the time taken for the laser light to travel to the target and back to the range finder, the range finder is able to calculate the distance from the range finder to the target. Other techniques such as continuous wave (CW) or frequency modulated (FM) modulated CW may be used to determine range. An "eye-safe" wavelength of 1,550 nm is typical although 1,064 nm or other wavelengths may be used as well.

Active imaging detects laser energy reflected by elements within a scene to form an image of the scene. The active image of a portion of the scene may augment a passive image of the entire scene. Active imaging provides a measurably higher signal-to-noise ratio (SNR) than passive imaging, Which can be useful for target detection, acquisition, classification or aimpoint selection.

U.S. Pat. No. 8,400,619 entitled "Systems and methods for automatic target tracking and beam steering" employs an image capturing system for acquiring a series of images in real time of a distant area containing a remote target, and a processing system for processing the acquired images to identify the target and follow its position across the series of images. An automatic beam steering system and method operate in conjunction with a laser source for emitting a laser beam to be transmitted in the form of a transmitted laser beam extending along a steerable beam transmission axis to the remote target. The beam steering system is controlled by the processing system to steer the beam transmission axis to be aimed at the target being tracked by the target tracking system, so that the transmitted laser beam will be transmitted at the appropriate angle and in the appropriate direction to be aimed at the tracked target. "The beam steering system may accomplish steering of the beam transmission axis by decentering or adjusting the position of one or more components of an optical system, . . . " (Col. 7, lines 6-14). This approach allows for small steering deviations off of boresight to designate a single tracked target.

The image processing system 34 controls the beam steering system 11 to compensate for positional changes of the target 26 by continuously adjusting the position of the laser source 15 as needed for the angle and direction of the beam transmission axis 25 to be aimed at the target 26 being tracked via the target tracking software 68. "Positional changes of the target may result from extraneous movement of the operator and/or movement of the target as discussed hereinabove." (Col 14, lines 1-6), "The target tracking and beam steering processes are performed very rapidly, with images typically being processed within the time it takes for the next frame to be received, such that the target tracking system 10 will normally "lock" on the target and the range finder 12 will be ready for range acquisition very quickly after the operator has appropriately directed the forward or pointing end of the transmission system 14 toward the target 26. Once the target 26 is "locked", activation of the range finder 12 to emit the laser beam 23 from the laser source 15 will result in the transmitted laser beam 24 being transmitted accurately to the target 26." Col 14, lines 44-54. In lay terms, the operator points the weapon at the target, the image capture system determines a small correction to point the laser precisely at the target, the beam steering system mechanically moves the optical component to make the correction and once "locked", the operator pulls the trigger to transmit the laser beam towards the single target. This method simply corrects the aimpoint for a single target.

Another class of problems involves tracking and illuminating multiple targets within a field-of-view (FOV) about boresight. An image capture system generates a list of tracked targets and angles-to-targets at the frame rate of the imaging system. One approach is to mechanically steer a laser spot-beam to illuminate different targets. Mechanical steering has size, weight, power and cost (SWaP-C) limitations that limit its effectiveness, especially for small platforms. Speed constraints limit the ability to illuminate multiple targets per frame within a FOV. Another approach is to non-mechanically steer a laser spot beam using optical phased arrays in combination with polarization gratings. This approach has a lower SWaP-C than mechanical beam steering but has a limited ability to illuminate multiple targets within a FOV.

The current state-of-the-art is to use a video camera and tracking card to generate the list of tracked targets and corresponding angles-to-targets, flood illuminate the FOV and simultaneously detect the reflected laser energy off of all of the targets in the FOV with an imaging detector. Flood illumination provides an active image of all of the targets in the FOV. This image may be correlated to the tracked targets and processed to compute the range to each of the targets. The SWaP-C of the laser to flood illuminate a FOV and the complexity of the processing to extract the range information and correlate it to the tracked targets is burdensome.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides non-mechanical beam steering that is capable of illuminating multiple tracked targets per frame one target at a time for target designation, range finding or active imaging over a wide FOV.

In an embodiment, a multiple target tracker and beam steerer comprises a video camera configured to acquire video images of a scene within a FOV within a frame time and a video tracker configured to process the video images within at least a cue-box within the FOV and output a list of tracked targets and corresponding angles-to-targets within the frame time. A laser is configured to produce a laser spot-beam, typically pulsed. A liquid crystal waveguide (LCWG) is responsive to command signals to steer the laser spot-beam over at least the entire cue-box. One or more processors are configured to process the list of tracked targets and corresponding angles-to-targets and generate command signals for the LCWG to steer the spot-beam to corresponding angles-to-targets to illuminate multiple tracked targets per frame one tracked target at a time. In different embodiments, the laser beam may be steered to illuminate each of the tracked targets on the list per frame or may be steered to illuminate all of the tracked targets on the list within a specified number of frames.

In different embodiments the LCWG's steering rate and angular range must be fast and wide enough to steer the laser beam over at least the cue box (and preferably the FOV) to designate a maximum of n targets with at least one pulse (and preferably at least two) per illuminated target. For range finding and active illumination, the greater the number of pulses on target, the more accurate the range estimate or the higher the SNR of the active image. For laser designation, the designation code may require a certain number of pulses. This may, for example, limit the number of designated targets per frame to maintain the proper pulse coding. Current LCWG technology has demonstrated steering speeds of up to 1°/µsec over a steering range of at least 35°×8°. For typical targeting environments, a steering rate of 1°/msec may suffice. A polarization grating stack may be used to extend the range to, for example, at least 50°×50° without a loss of system resolution within the expanded angular range.

In different embodiments, the ability to discretely and rapidly steer the laser beam with the LCWG enables prioritization of tracked targets to vary the revisit rate (e.g., every Nth frame) or dwell time (e.g., the number of pulses for a specific target within a single frame) for a tracked target. The revisit rate determines how often the tracked target is illuminated while the dwell time determines how many pulses per illuminated target. Prioritization may be based on the range-to-target, heading of the target or location of the tracked target within the cue-box, other target information (e.g., target identification) or a combination thereof. This provides great flexibility for illuminating targets in a multi-target environment.

In an embodiment, a user interface accepts commands from an operator to select a mode of operation (Designation, Range Finding, Active Imaging or a combination thereof). The user interface may also be configured to accept operator commands to control cue-box size and position within the FOV and target selection. The user interface may also be configured to allow the operator to vary the steering speed of the LCWG to determine the rate at which tracked targets are illuminated and to set a "keep out" range that determines prioritization.

In different embodiments, a LADAR detector is configured to sense reflected laser energy. The video camera may comprise an out-of-band, in-band or dual-band detector with respect to the spectral band of the LADAR detector. The in-band and dual-band video cameras can be used to provide closed-loop adjustments to the command signals to steer the LCWG. Each configuration may be used for target designation and range finding. For in-band and dual-band video cameras, the video camera may sense the reflected laser energy for active imaging. The in-band video camera or in-band portion of the dual-band camera may be used as the LADAR detector by combining the LADAR signal processing with the video processing.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a multiple target tracker and beam steerer that utilizes a liquid crystal waveguide (LCWG) beam steering to designate multiple tracked targets per frame time one target at a time for target designation, range finding or active imaging. The steering rate and range as well as discrete steering capability afforded by the LCWG supports various tracker configurations (out-of-band, in-band or dual-band video cameras), LADAR detectors (single pixel or focal plane array) and prioritization of tracked targets to vary the revisit rate (every Nth frame) or dwell time (within a single frame) for an illuminated target. The LCWG can be used to steer a pulsed or continuous wave (CW) beam. A user interface accepts commands from an operator to select a designation, range finding or active Imaging mode, control cue-box size and position within the FOV and target selection. The reflected laser energy may be detected and processed to compute range-to-target and/or a higher SNR image of the target to augment the video display. Alternately, a remote friendly third party may detect the reflected laser energy for the designated target.

Figure 1:
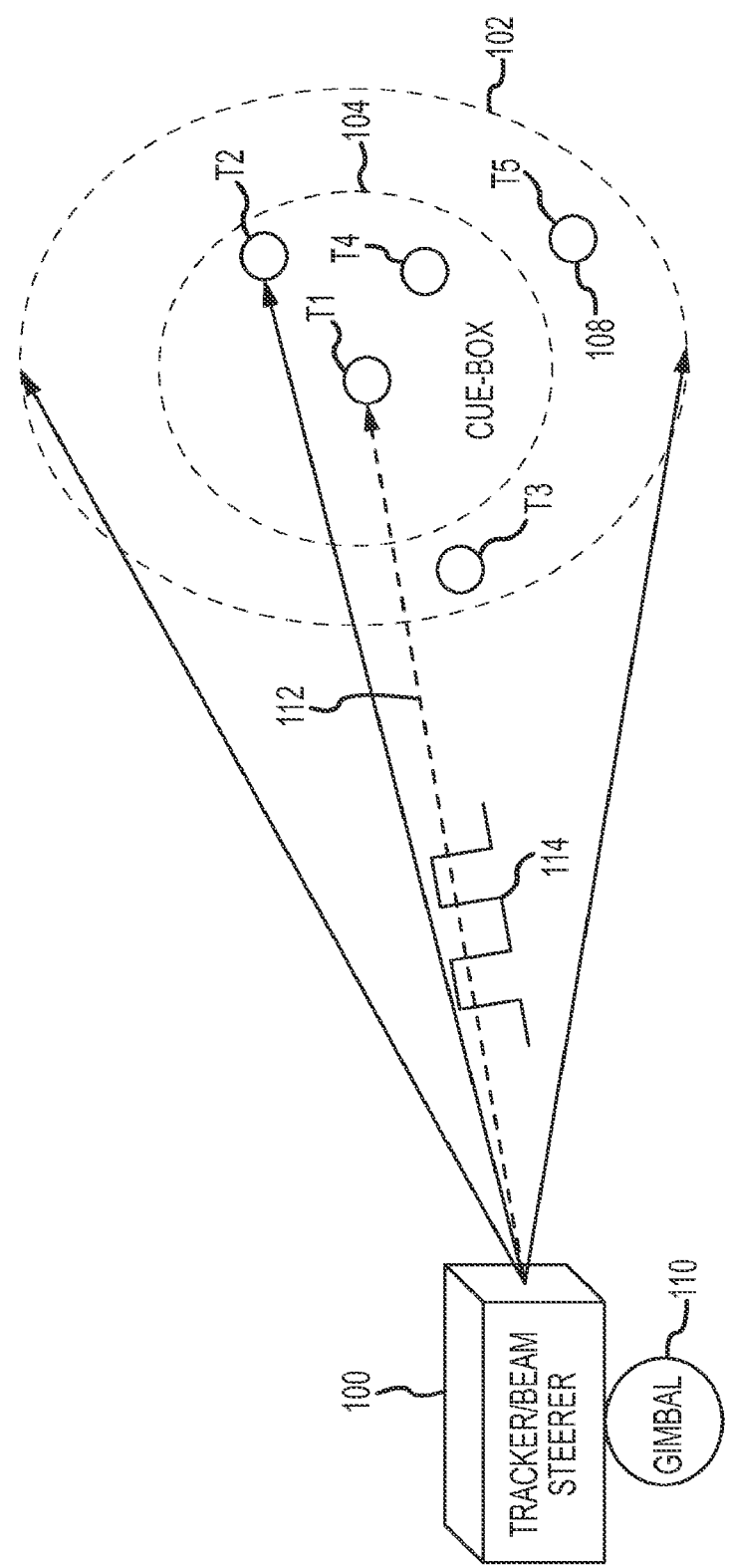
FIG. 1 is a diagram of a multiple target tracker and laser beam steerer configured to track and sequentially illuminate multiple targets per frame within a FOV.
Figure 2:
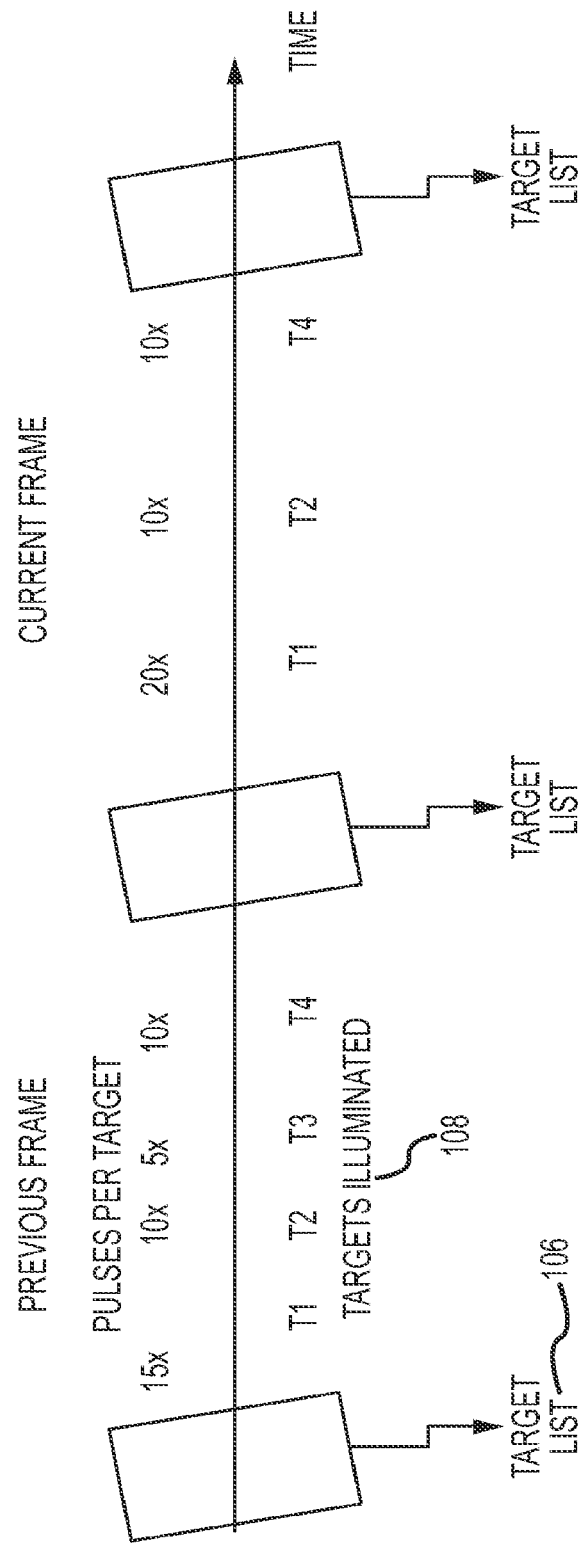
FIG. 2 is a timing diagram illustrating a notional sequence for the tracking and laser illumination of multiple targets per frame.

Referring now to FIGS. 1 and 2, an embodiment of a multiple target tracker and beam steerer ("tracker/beam steerer") 100 for Designation, Range Finding or Active Imaging acquires video images of a scene within a FOV 102 at a frame rate (e.g., 30 Hz) that defines a frame time, processes the video images within at least a cue-box 104 (e.g., a circle or rectangle) within the FOV and outputs a list 106 of tracked targets T1, T2, T3, ... 108 and corresponding angles-to-targets within the frame time. The size of cue-box 104 is typically set as a percentage of the FOV 102. The tracker is typically limited to outputting a maximum number of "n" tracked targets on the list. The tracker/beam steerer 100 is suitably mounted on a mechanical gimbal 110 to point its boresight axis 112 in a particular direction e.g., at a selected one of the targets 108. However, the mechanical gimbal 110 is not required for operation of the tracker/beam steerer system.

Tracker/beam steerer 100 produces a pulsed laser spot-beam 114 with a certain PRF, whose spectral band may or may not overlap the spectral band of the passively acquired video images. The tracker/beam steerer 100 processes the list of tracked targets and corresponding angles-to-targets and generates command signals to steer the pulsed laser spot-beam to the corresponding angles-to-targets using, at least in part, liquid crystal waveguide (LCWG) technology, to illuminate multiple tracked targets per frame one target at a time. The tracker/beam steerer 100 generates the command signals to set the revisit rate (e.g., every Nth frame) and dwell time (e.g., the number of pulses per target per frame) of each target based on target prioritization. The steering range, at least 35°×8°, and steering rate, at least 1 degree per millisecond, and discrete steering control afforded by LCWG allows for multiple and sequential target tracking per frame over a wide FOV. A sufficient number of pulses can be placed on target to enable target designation, or to improve the accuracy of the range estimate or increase the SNR of the active image.

The ability to steer the laser beam discretely, quickly and finely over a large steering range greatly expands the tradespace for designing the tracker/beam steerer for designation, range finding or active imaging applications. The minimum steering speed may be defined as the product of the required steering range, maximum number of targets, number of pulses per illuminated target and PRF, and the frame rate. For example the minimum steering rate is 1° per millisecond, for a 5.8°×5.8° FOV (8.2° diagonal) where each target is located at extreme corners, a maximum of 5 targets, 10 pulses per target, 100 kHz PRF and a 30 Hz frame rate. For laser designation, the designation code may require a lower PRF. This may, for example, limit the number of designated targets per frame to enable the proper pulse coding. In this mode, steering to 5 targets across the 10° FOV takes 32.8 milliseconds, leaving only 0.5 milliseconds for designation. The irregular pulse rate for designation means the system may have to wait more than 0.5 milliseconds for the proper pulse coding. Switching to only 3 targets per frame enables up to 17 milliseconds of spare time to ensure proper designation codes.

Figure 5:
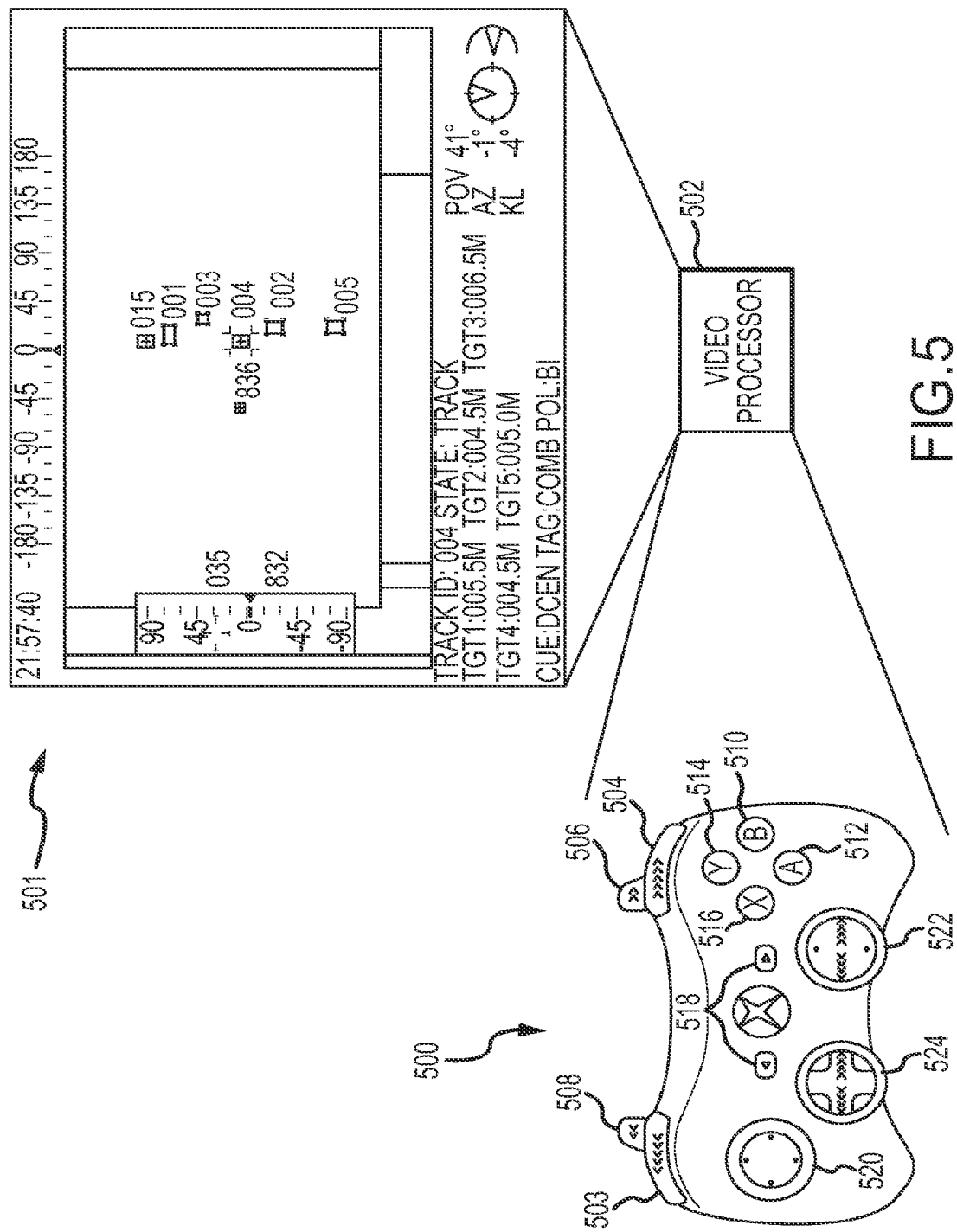
FIG. 5 is a diagram of a user interface and display for the multiple target tracker and beam steerer.

As illustrated in FIGS. 1 and 2, 5 targets T1, T2, T3, T4 and T5 are positioned in the FOV 102 of tracker/beam steerer 100. Tracker/beam steerer 100 tracks and outputs the list of tracked targets for any target that was acquired in the cue-box 104. Targets T1, T2 and T4 are currently positioned inside cue-box 104. Target T3 was acquired in the cue-box in a previous frame but has left the cue-box. Target T5 has not been acquired (e.g., sensed by the camera and corresponding target data entered into the video/beam steering processing functions). In this example, prioritization is determined such that tracked targets currently within the cue-box are revisited every frame and tracked targets outside the cue-box are revisited every Nth frame. In every Nth frame, the dwell time of a tracked target in the cue-box is set at a nominal value (e.g., 10 pulses) whereas the dwell time of a primary tracked target along boresight is set at a higher value (e.g., 15 pulses) and the dwell time of tracked target outside the cue-box is set at a lower value (e.g., 5 pulses). In the other N−1 frames, the pulses previously allocated to those tracked target outside the cue-box may be allocated to the primary target. This is example is merely illustrative of the capability afforded by LCWG beam steering to prioritize the revisit rates and dwell times of tracked targets based on heading of the tracked target and position within the cue-box.

Figure 3:
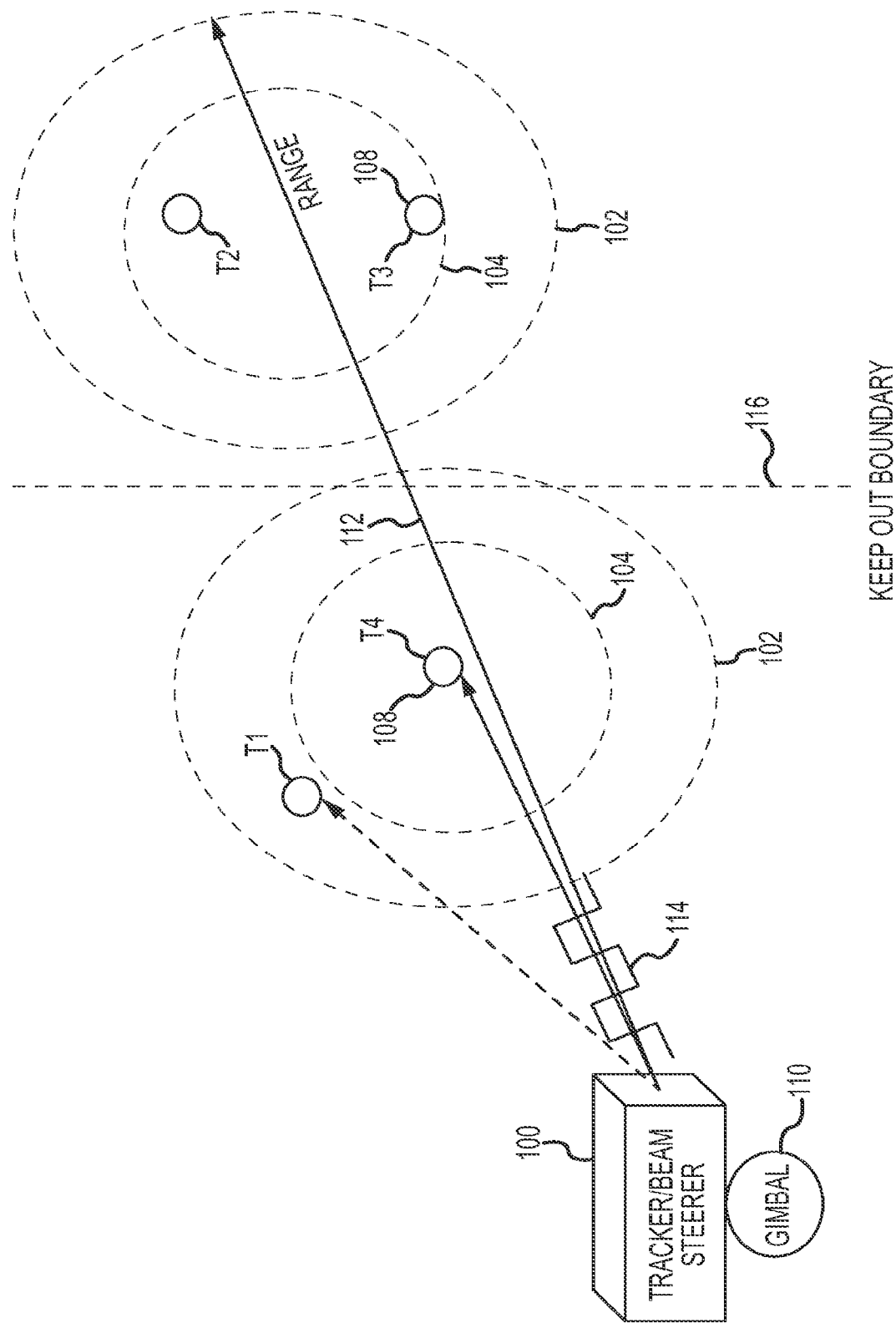
FIG. 3 is a diagram of an embodiment of a multiple target tracker and beam steerer in which illumination is prioritized by range-to-target.
Figure 4:
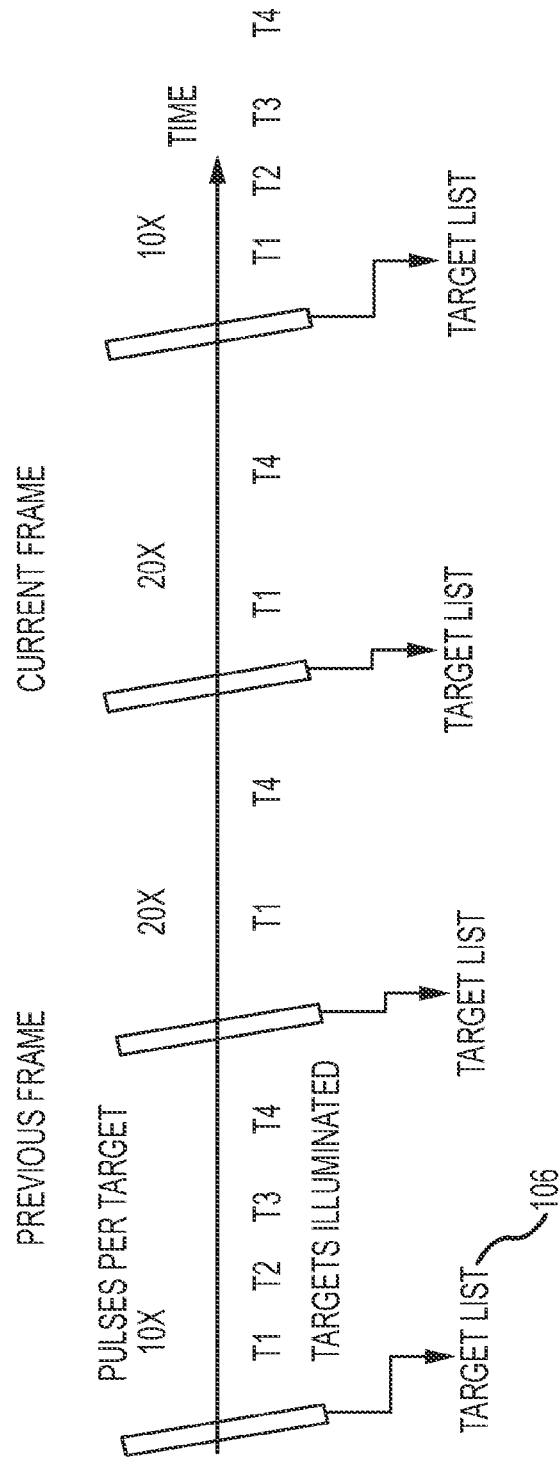
FIG. 4 is a timing diagram illustrating a notional sequence for the tracking and laser illumination of multiple targets per frame.

As illustrated in FIGS. 3 and 4, 4 targets T1, T2, T3 and T4 are positioned in the FOV 102 of tracker/beam steerer 100. All targets have been acquired and are being tracked. In this example, prioritization is determined based on range-to-target. The tracker/beam steerer 100 enforces a keep out boundary 116, which may be preset, determined by a system operator or varied based on the targeting environment. Targets T1 and T4 that are inside the keep out boundary 116 are revisited every frame. Targets T2 and T2 that are outside the keep out boundary 116 are revisited every 4th frame in this example. The dwell times are allocated equally among the designated targets within a given frame. Again, this is merely illustrative of the capability afforded by LCWG beam steering. More generally, tracker/beam steerer 100 may assign priority in the form of revisit rates and dwell times based on the angle to target, position of the target in the cue-box or FOV, range to target or other target information (e.g., target identification) or combinations thereof. The capability to sequentially and discretely illuminate multiple tracked targets within each frame while prioritizing the designation of individual targets based on various target driven criteria greatly enhances multiple target tracking and designation when compared to current "flash" systems.

Referring now to FIG. 5, in an embodiment a multiple target tracker and beam steerer may include a user interface 500 and display 501. The raw video from the tracker/beam steerer may be fed to display 501 and displayed to the operator. User interface 500 communicates with display 501 via a video processor 502 in the tracker/designator. Video processor 502 may generate and overlay information such as Azimuth and Elevation heading along the X and Y axes, respectively, system state, highlight the target track ID and provide alternate heading information, or other target information requested by the user.

User interface 500 includes a number of configurable options that allow the operator to interact with and control various aspects of the multiple target tracking and beam steering such as mode selection (Designation, Range Finding, Active Imaging or combinations thereof), target selection for boresight tracking with the gimbal, setting the keep out boundary distance, setting the position and size of the cue-box and varying the LCWG steering rate among others. In an embodiment, user interface 500 is a gamepad controller configured for tracking and beam steering and includes a switch 503 to turn the display on/off, a switch 504 to tag highlighted targets to move from cue to tracked status, a switch 506 to cycle highlighting through tagged targets and a switch 508 to untag all targets. User interface 500 includes a "B" switch 510 to toggle through functions such as mode selection, manually steering the laser, and manually steering the gimbal, an "A" switch 512 to track highlighted target using gimbal along camera boresight, a "Y" switch 514 to break closed loop track and an X" switch 516 to enable ranging. Switches 518 and 520 provided gamepad enable/disable and LCWG & laser tracking enable/disable, respectively. Joysticks 520 and 522 allow motion to set the cue box size and position, respectively, and pressing to reset cue box size and position. Four-position d-pad 524 enables up and down to increase and decrease LCWG steering rate and left and right to toggle through targets. The same or similar functionality may be implemented in a variety of different physical user interfaces.

Figure 6:
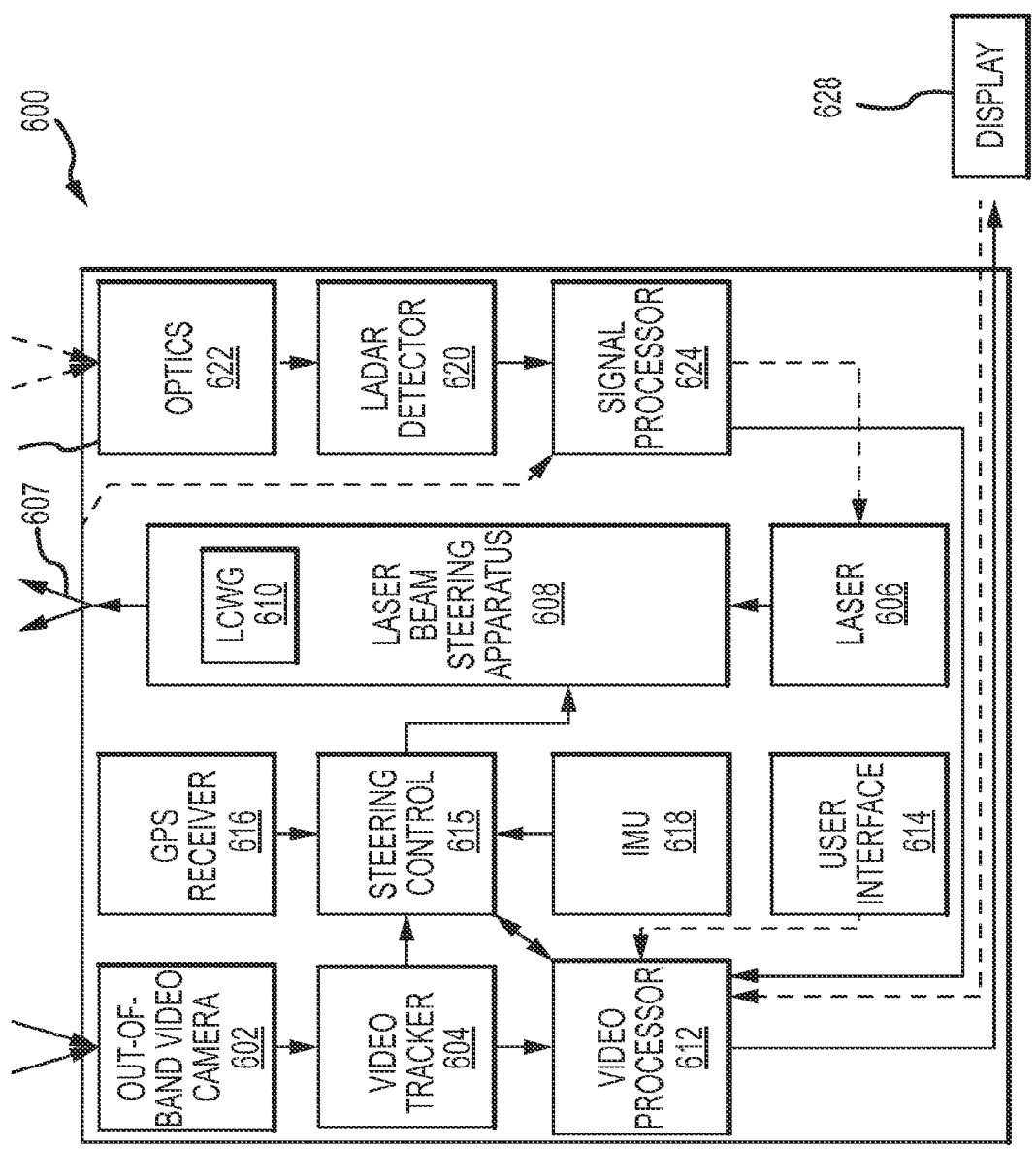
FIG. 6 is a block diagram of an embodiment of the multiple target tracker and beam steerer using an out-of-band video camera for tracking.

Referring now to FIG. 6, an embodiment of an "out-of-band" tracker/beam steerer 600 tracks and illuminates targets in different spectral bands to provide target Designation or Range Finding. Target tracker/beam steerer 600 comprises an out-of-band video camera 602 configured to acquire video images of a scene within a FOV within a frame time and a video tracker 604 configured to process the video images and output a list of tracked targets and angles-to-targets within the frame time. A laser 606 is configured to produce a pulsed laser spot-beam 607 at a PRF in a different spectral band. For example, the laser may produce the laser spot-beam 607 in the short-wave infrared (SWIR) while the video camera 602 is configured to passively acquire video images in the mid-wave infrared (MWIR). A laser beam steering apparatus 608 including a liquid crystal waveguide (LCWG) 610 is responsive to voltage signals to discretely steer the laser spot-beam both in-plane and out-of-plane to the corresponding angle-to-target.

A video processor 612 is configured to process the list of tracked targets, inputs from a user interface 614 such as target selection, cue-box position and size, LCWG steering rate and prioritization criteria and generate command signals for the LCWG. Within a given frame time, the command signals dictate which tracked targets are designated and for how long (e.g., number of pulses per illuminated target). From frame-to-frame, the command signals embody the revisit rate for the various targets. For laser Designation, the command signals embody the defined pattern of pulses to form the designation code. Video processor 612 may receive the same or similar information from a source external to the tracker/designator 600.

The command signals are provided to steering control 615 along with the list of tracked targets (and angles) from video tracker 604, position from a GPS receiver 616 and orientation from an IMU 618. Steering control 615 produces the voltage signals to drive LCWG 610 to illuminate the tracked target with one or more pulses one target at a time within the frame time.

A LADAR detector 620 is configured to sense reflected laser energy at a sampling rate sufficient to detect the one or more pulses that illuminate the tracked target. LADAR detector 620 may be a single-pixel detector or a pixelated detector. A single-pixel detector has the advantages of low SWaP-C, reduced processing and lower noise. A pixelated detector has the advantages of simplified receiver design, larger FOV, and verification of the steered laser beam position for closed-loop control.

Optics 622 are configured such that detector 620 senses reflected laser energy over at least the entire cue-box and suitably the entire FOV of the video camera. Optics 622 may be shared with video camera 602, in which case a beam splitter is used to split the incident light into the respective spectral bands. Optics 622 may provide a zoom capability. For example, at great distances the FOV may be narrowed to increase the spatial resolution to facilitate target acquisition. As the range-to-target decreases, the FOV may be widened to facilitate multiple target tracking and designation.

A signal processor 624 processes the detector response to the reflected laser energy to determine range-to-target. The signal processor will typically operate on the "time of flight" principle by measuring the time taken for the laser beam to travel to the target and be reflected back to the range finder. The signal processor determines when the pulsed spot-beam is transmitted either by directly controlling laser 606 or by picking off a small amount of the laser output (<1%). With the speed of the laser light being a known value, and with an accurate measurement of the time taken for the laser light to travel to the target and back to the range tinder, the range tinder is able to calculate the distance from the range finder to the target. Other techniques such as CW or FM modulated. CW may be used to determine range. The signal processor sends the range-to-target to the video processor 612, which pairs it with the designated target, and sends a video signal to display 628.

U.S. Pat. No. 8,380,025 entitled "Liquid Crystal Waveguide Having Refractive Shapes for Dynamically Controlling Light" assigned to Vescent Photonics, Inc., which is hereby incorporated by reference, discloses a LCWG that can be customized to provide rapid and discrete steering over a defined angular range up to ±35°x±8° with current technology. The patent discloses a LCWG that is configurable to form and scan a laser spot over a FOR to provide a relative illumination for active sensors. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, effective refractive-index properties of portions of the liquid crystal material can be modulated to form refractive optical component shapes (e.g. planar lenses or planar prisms) in the cladding that interact with a portion (specifically the evanescent field) of light in the waveguide so as to permit electronic control of the refraction/bending, focusing, or defocusing of light as it travels through the waveguide.

The shape of the prism components determines the amount of in-plane steering within the LCWG. The prism elements are arranged in a horn configuration where multiple smaller apex angle prisms deviate the laser beam successively where the start of the horn has smaller aperture, larger apex angle prisms and the end of the horn has larger aperture, smaller apex angle prisms. The number of prisms within the horn and apex angle of each prism determines the total LCWG steering angle at maximum deflection in the plane of the LCWG. The commercially available LCWG horn electrode configuration produces a 35°×8° FOR from a 1 mm diameter entrance beam.

Steering out of the plane of the LCWG is achieved using a rectangular electrode that modulates the effective index of refraction of the core in the region above the internal taper. This modulation changes the angle of light exiting the LCWG due to the internal taper and enables out of plane steering.

In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. The electrodes are positioned within the LCWG and orientated according to the shape of the LCWG core such that each electrode modulates the liquid crystal material for a different direction of steering. In another example, such refractive shapes of liquid crystal material may be formed by patterning or shaping a cladding to define a region or cavity to contain liquid crystal material in which the liquid crystal materials may interact with the evanescent light. The LCWG controller includes command and synchronization electronics that receive a start of frame/row from a ROIC and generate analog drive signals that specify the scan pattern and a drive controller that converts the analog drive signals to a high frequency, high voltage drive signal applied to the LCWG. These command and synchronization electronics may also synchronize the pulses from the laser source.

Figure 7A:
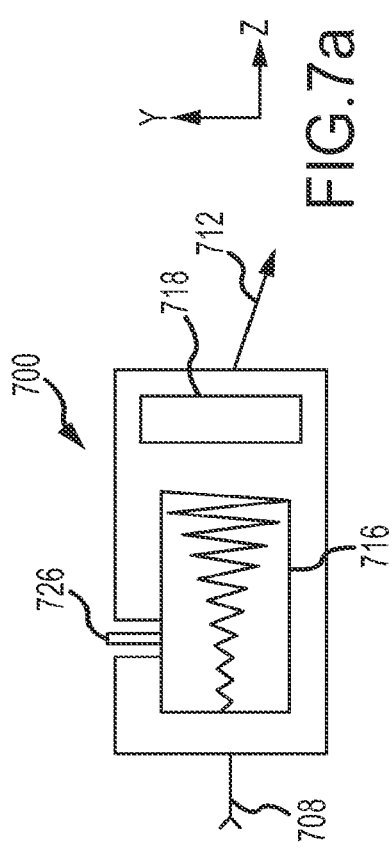
FIGS. 7a, 7b and 7c are top, front and side views of an embodiment of a LCWG configured for laser beam steering.
Figure 7C:
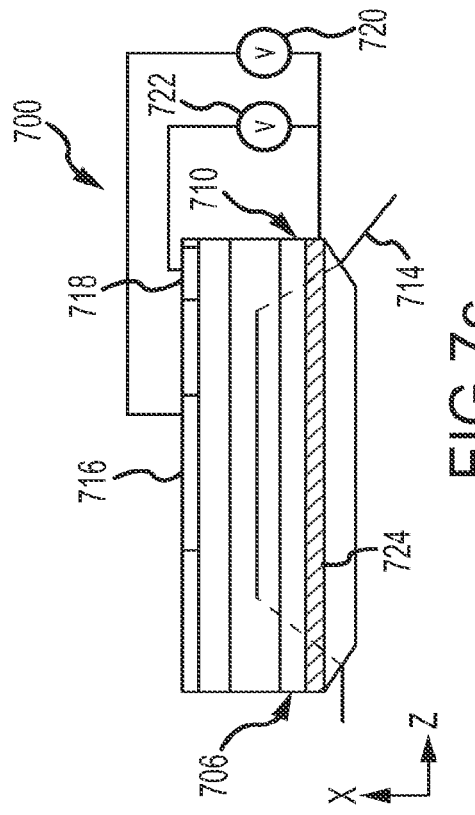
Figure 7B:
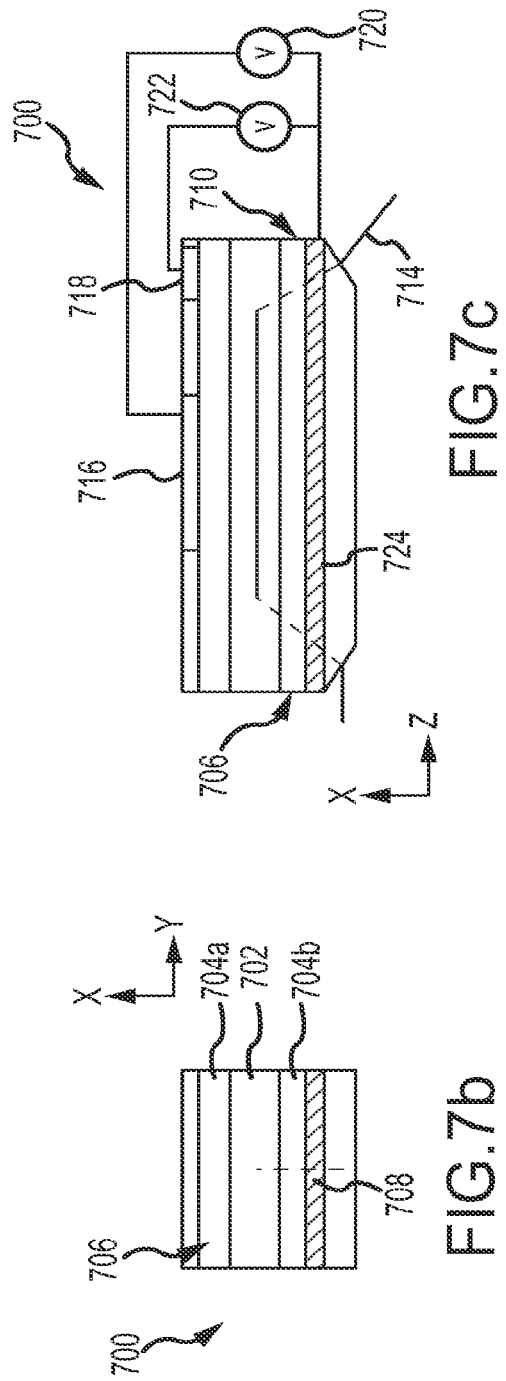

Referring now to FIGS. 7a, 7b and 7c, the waveguide 700 may be generally rectangular in shape and may include a core 702 having a generally rectangular cross-section or defining a parallelepiped between upper and lower claddings 704a and 704b. On the front end 706 of the waveguide 700, light 708 is introduced into the waveguide core 702 and propagates along the length of the waveguide 700 to the distal end 710 of the waveguide 700. The direction of propagation of light 708 through the waveguide 700 is generally along the length of the waveguide 700, and use of embodiments of the present invention permit the in-plane steering angle 712 and out-of-plane steering angle 714. The steering is altered depending, in part, on the shapes of the upper shaped in-plane electrode 716 (e.g. a horn electrode formed of prism elements) and upper out-of-plane electrode 718, and the voltages 720 and 722 applied between the electrodes 716 and 718 and the ground plane 724. Although the waveguide 700 is shown as generally rectangular, it is understood that a waveguide made according to one or more embodiments of the present invention could have other shapes such as square, trapezoid, parallelogram, any polygon, or even be diced or scribed so as to have rounded edges producing elliptical, circular, or any curved shape.

In one example, the shaped in-plane electrode 716 may include a tab or extension therefrom 726 which permits the patterned electrode(s) to be electrically connected to other electrical elements, such as a voltage source 720 coupled between the shaped in-plane electrode 716 and the lower electrode or plane 714. Alternatively, electrical traces, conductors, vias or other conventional connection types may be utilized instead of or with tab 726 to electrically couple shaped in-plane electrode 716 to other electrical elements.

The steering range of the laser steering apparatus may be increased by pairing the LCWG with a polarization grating (PG) stack. The PG stack provides relatively coarse steering over a wide range while the LCWG provides relatively fine steering. See WO 2014/200581 "Non-Mechanical Beam Steering Tracking System" published Dec. 18, 2014 that provides a field-of-regard (FOR) of 120°×120° or more. Embodiments of a stack of PGs are described in J. Kim, C. Oh, M. J. Escuti, L. Hosting, and S. A. Serati, "Wide-angle, nonmechanical beam steering using thin liquid crystal polarization gratings," Advanced Wavefront Control: Methods, Devices, and Applications VI (SPIE, 2008). Also, see co-pending U.S. patent application Ser. No. 14/811,361 entitled "Non-Mechanically Steered High-Power laser Transmitter" filed Jul. 28, 2015, that limits the steering range of the LCWG to at most ±2°×±2° in order to amplify the laser spot-beam over a FOR of ±10°×±10° or more.

Figure 8:
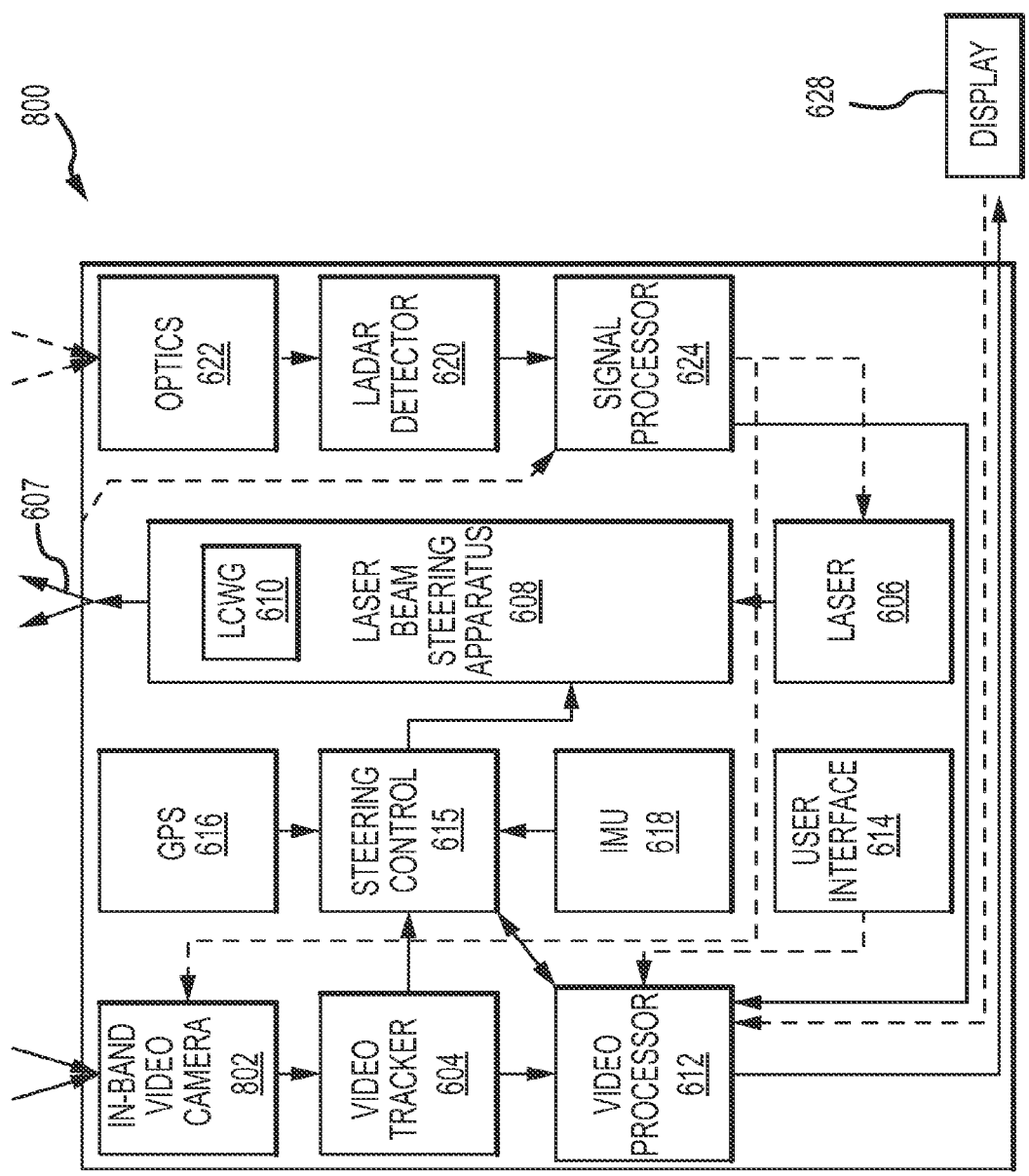
FIG. 8 is a block diagram of an embodiment of the multiple target tracker and beam steerer using an in-band video camera providing closed-loop steering control.

Referring now to FIG. 8, an embodiment of an "in-band" tracker/beam steerer 800 tracks and illuminates targets in the same spectral band (e.g., SWIR or MWIR). The in-band tracker/beam steerer can be used for target Designation, Range Finding or Active Imaging. There is considerable similarity of the in-band and out-of-band configurations. Accordingly, like reference numbers are used to refer to like components. For clarity and efficiency, only those components and functions that differ will be described.

An in-band video camera 802 is configured to acquire video images of a scene within a FOV within a frame time in the same spectral band as LADAR detector 620. Operating in the same band provides multiple possible advantages. First, the in-band video camera will simultaneously capture an image of both the target to be designated and the reflected laser energy (ideally the reflected laser energy is aligned with the target center). As will be described in conjunction with FIG. 10, any error can be used to provide closed-loop steering control of the LCWG. Second, since the reflected laser energy is "in-band" it is sensed by the video camera to form an active image of the illuminated target as part of the video image. Imagery obtained via active imaging with a laser will have a higher SNR than imagery passively obtained with the video camera. Signal processor 624 is configured to send a timing signal to in-band video camera 802 (or video tracker 604) to identify those images that contain reflected laser energy. Identifying frames that contain laser pulses enables the video tracker 604 to maintain track on targets even with the higher SNR scene.

Figure 9:
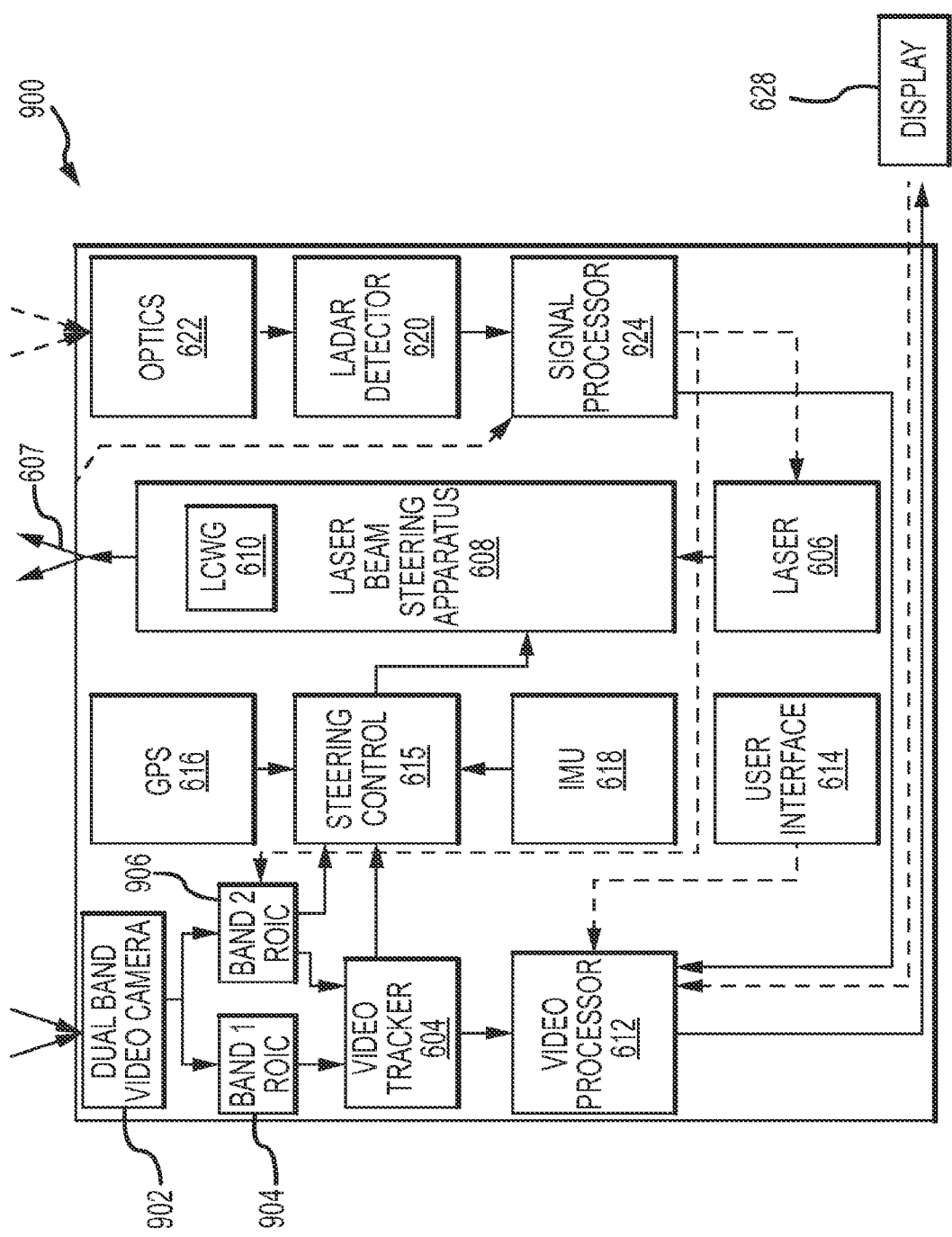
FIG. 9 is a block diagram of an embodiment of the multiple target tracker and beam steerer using a dual-band video camera providing closed-loop steering control and dual-band target tracking.

Referring now to FIG. 9, an embodiment of a "dual-band" tracker/beam steerer 900 tracks targets in a pair of bands (e.g., SWIR and MWIR) and illuminates targets in one of the two bands (e.g., SWIR). The dual-band tracker/beam steerer can be used for target Designation, Range Finding or Active Imaging. There is considerable similarity of the dual-band and out-of-band configurations. Accordingly, like reference numbers are used to refer to like components. For clarity and efficiency, only those components and functions that differ will be described.

A dual band video camera 902 is configured to passively acquire video images of a scene within a FOV within a frame time in first and second spectral bands, with the second spectral band being the same spectral band as the LADAR detector 620 (or physically the same detector). Band 1 and Band 2 readout integrated circuits (ROICs) 904 and 906 process the first and second spectral bands, respectively. The ROICs are typically implemented as an integral part of dual band video camera 902. Operating in the same band provides the advantages presented for the in-band configuration plus others. The images generated in the first spectral band by the Band 1 ROIC 904 are unaffected the reflected laser energy. In a first mode of operation, the second spectral band (Band 2 ROIC 906) is used only to provide closed-loop steering control. In this case, band 2 ROIC 906 does not have to blank the images. In a second mode, the second spectral band (Band 2 ROIC 906) is used to provide closed-loop steering control and dual-band tracking. In this case, band 2 ROIC 906 does have to identify those images containing reflected laser energy.

Figure 10:
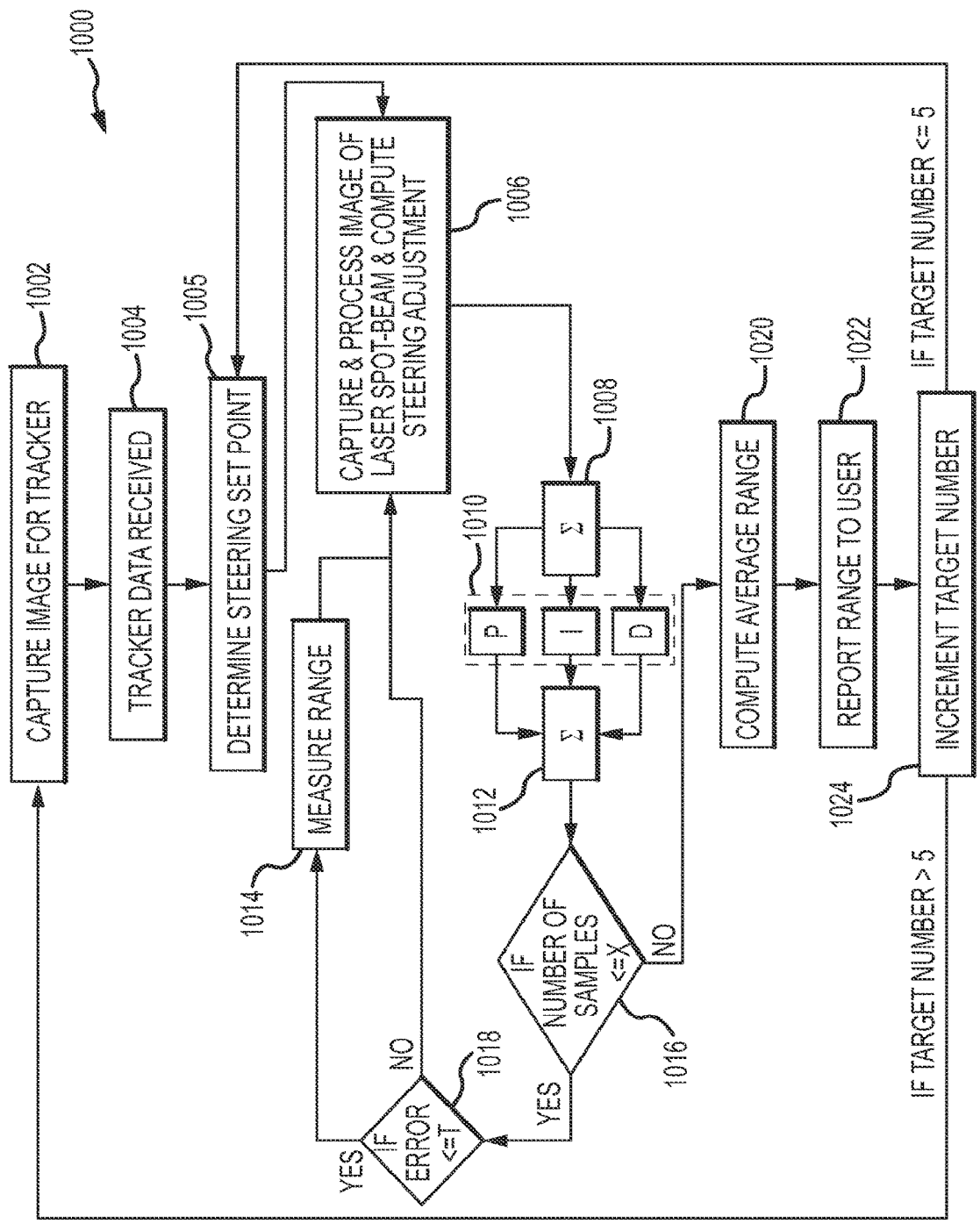
FIG. 10 is a diagram of a closed-loop tracking algorithm that tracks the locations of the tracked target and illumination on the target to steer the laser to more precisely illuminate the target.

Referring now to FIG. 10, a closed-loop steering control algorithm 1000 based on the Proportional-Integral-Derivative (PID) algorithm utilizes the "in-band" property of the reflected laser energy in the video imagery. An image is captured by the in-band video camera (or in-band portion of a dual-band video camera) (step 1002) and sent to the tracker to determine the locations of the targets (step 1004). The tracker sends at least the size and location of the multiple targets to Steering Control for processing. Steering Control determines the steering set point (step 1005) and applies the steering voltages to the LCWG to steer the laser spot-beam to the target position. The image of the laser spot-beam is captured, processed to determine the location of the illuminated target (step 1006) and the steering adjustment is computed in the following loop. The difference of the set point (Error T set initially at constant value) and location of the laser beam is computed using a first sum 1008. A PID section 1010 determines the constants required to correct steering. The error is summed using a second sum 1012. If the number of samples≤the minimum number of samples X 1016, where samples is the number of sampled pulses, the loop continues to measure the range. If the error is <=threshold error T 1018, the range is measured. Otherwise, if the error is >threshold error T only the steering adjustment is made at 1006 and the loop repeats. The error must be less than T so you can verify the laser beam is pointing to the proper target. If the number of samples is >threshold X 1016, the loop exits. Using the total samples, the average range is computed 1020, reported to the user and video processor 1022 and the target number is incremented 1024 to measure the range to the next target. This entire process occurs within a few tens of microseconds.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A multiple target tracker and beam steerer, comprising:
a video display;
a video camera configured to acquire video images of a scene within a FOV within a frame time and display the video images on the video display;
a video tracker configured to process the video images within at least a cue-box within the FOV and output a list of tracked targets and corresponding angles-to-targets within the frame time;
a laser configured to transmit a pulsed laser spot-beam at a single wavelength with a pulse repetition frequency (PRF);
a solid-state laser steering apparatus comprising a liquid crystal waveguide (LCWG) responsive to command signals capable of discretely steering the spot-beam over a range of at least 35°×8° at a rate of at least 1 degree per millisecond;
one or more processors configured to process the list of tracked targets and corresponding angles-to-targets and generate command signals for the LCWG to steer the spot-beam to corresponding angles-to-targets to illuminate multiple discrete tracked targets per frame one tracked target at a time;
a detector configured to sense at least one pulse of reflected laser energy over at least the entire cue-box per illuminated target per frame;
a user interface configured to accept commands from the operator for at least mode selection from Designation, Range Finding and Active illumination modes,
wherein in Designation mode, said laser is configured to transmit a defined pattern of pulses to form a designation code, said command signals generated to synchronize steering of the spot-beam to illuminate each of the multiple tracked targets to receive the proper pulse within the defined pattern of pulses per frame;
wherein in Range Finding mode, said command signals generated to synchronize steering of the spot-beam to illuminate each of the multiple tracked targets with at least one pulse per frame, said one or more processors configured to produce a range estimate for each of the illuminated targets; and
wherein in Active Imaging mode, said command signals generated to synchronize steering of the spot-beam to illuminate each of the multiple tracked targets with at least one pulse per frame, said video images including an active image of the illuminated targets.

2. The multiple target tracker and beam steerer of claim 1, wherein the video tracker outputs the list including a maximum of n tracked targets, wherein the one or more processors generate command signals for the LCWG to steer the laser spot-beam to illuminate all of the multiple tracked targets on the list within a specified maximum number of frames one tracked target at a time.

3. The multiple target tracker and beam steerer of claim 1, wherein the user interface is further configured to allow a user to perform one or more of (1) increase or decrease the steering speed to determine the rate at which tracked targets are illuminated, (2) toggle through tracked targets and select a target to point the video camera at the selected target, (3) set the size and position of the cue-box to force the video tracker to cue on a target, (4) set a minimum range whereby tracked targets inside the minimum range are prioritized, (5) select a mode from Designation, Range Finding and Active Imaging or a combination thereof.

4. The multiple target tracker and beam steerer of claim 1, wherein the detector is a single pixel detector.

5. The multiple target tracker and beam steerer of claim 1, wherein the one or more processors are configured to prioritize tracked targets and to generate the command signals to steer the laser spot-beam to vary the revisit rate for a tracked target or a dwell time to illuminate the tracked target based on its priority.

6. The multiple target tracker and laser beam steerer of claim 1, wherein the video tracker continues to track targets that leave the cue-box, wherein said LCWG steers the spot-beam to designate targets that leave the cue-box within a steering range of the laser beam steering apparatus and FOV of the video camera.

7. The multiple target tracker and laser beam steerer of claim 1, wherein the one or more processors are configured to prioritize tracked targets based on one or more of the range to tracked target, heading of the tracked target or location of the tracked target within the cue-box and to generate the command signals to steer the laser spot-beam to vary the revisit rate for a tracked target to every Nth frame or a dwell time to illuminate the tracked target with the frame based on its priority.

8. The multiple target tracker and laser beam steerer of claim 1, wherein the one or more processors are configured to prioritize tracked targets and to generate the command signals to steer the laser spot-beam to vary the revisit rate for a tracked target to every Nth frame or a dwell time to illuminate the tracked target with the frame based on its priority.

9. The multiple target tracker and laser beam steerer of claim 1, wherein the laser spot beam comprises a pulsed laser spot-beam with a pulse repetition rate (PRF) in which a defined pattern of pulses form a designation code.

10. The multiple target tracker and laser beam steerer of claim 9, wherein said one or more processors are configured to generate command signals for the LCWG to synchronize steering of the pulsed laser spot-beam with the transmission of the defined pattern of pulses to illuminate each of the multiple tracked targets with at least one defined pattern of pulses.

* * * * *